United States Patent
Foor et al.

(10) Patent No.: US 6,648,624 B1
(45) Date of Patent: Nov. 18, 2003

(54) THERMOFORMING MACHINE TOOLING ASSEMBLY WITH PLUG ASSIST TOOLING

(75) Inventors: Martin J. Foor, Gladwin, MI (US); Terry J. Libera, Beaverton, MI (US); William E. Wells, Sanford, MI (US)

(73) Assignee: Brown Machine, LLC., Beaverton, MI (US)

(*) Notice: Subject to any disclaimer, the term of this patent is extended or adjusted under 35 U.S.C. 154(b) by 137 days.

(21) Appl. No.: 09/996,062

(22) Filed: Nov. 28, 2001

Related U.S. Application Data

(60) Provisional application No. 60/255,752, filed on Dec. 14, 2000, and provisional application No. 60/250,217, filed on Nov. 30, 2000.

(51) Int. Cl.⁷ .............................................. B29C 51/10
(52) U.S. Cl. .................... 425/302.1; 425/388; 425/398; 425/DIG. 47; 425/DIG. 48
(58) Field of Search .............................. 425/302.1, 307, 425/193, 122, 387.1, 388, 398, DIG. 48, DIG. 47; 264/297.5

(56) References Cited

U.S. PATENT DOCUMENTS

| | | | | |
|---|---|---|---|---|
| 4,878,826 A | * | 11/1989 | Wendt | 425/384 |
| 4,883,633 A | * | 11/1989 | French | 264/550 |
| 5,002,479 A | * | 3/1991 | Brown et al. | 425/398 |
| 5,225,213 A | * | 7/1993 | Brown et al. | 425/292 |
| 5,720,992 A | * | 2/1998 | Brown | 425/388 |

FOREIGN PATENT DOCUMENTS

| | | | | |
|---|---|---|---|---|
| JP | 404161318 A | * | 6/1992 | |
| JP | 404161319 A | * | 6/1992 | |

* cited by examiner

Primary Examiner—Robert Davis
Assistant Examiner—Joseph S Del Sole
(74) Attorney, Agent, or Firm—John R. Benefiel

(57) ABSTRACT

A plug assist tooling assembly for a roll fed, post trim thermoforming machine in which a spider plate connecting plug assist rods is located below one or more support plates holding a clamping plate having an array of holes formed therein each defining a chamber each receiving a plug assist which chambers are sealed when sheet material is clamped by rings encircling the open top of each chamber to enable air pressure communicating to each chamber to exert forming pressure on the section of sheet material within each clamping ring. The support plates are fixed spaced from one of the main platens by standoffs fixed relative to the support plate or plates and the platen, the spider plate located in the same space.

5 Claims, 3 Drawing Sheets

THERMOFORMING MACHINE TOOLING ASSEMBLY WITH PLUG ASSIST TOOLING

CROSS REFERENCE TO RELATED APPLICATION

This application claims the benefit of provisional application U.S. Ser. No. 60/250,217, filed Nov. 30, 2000 and U.S. Ser. No. 60/255,752, filed Dec. 14, 2000.

BACKGROUND OF THE INVENTION

This invention concerns thermoforming machines which use vacuum and/or air pressure to cause preheated sheet plastic material to be forced into conformity with mold cavities in order to form such products as plastic cups. A number of such products may be formed simultaneously from plastic sheet material inserted across an array of mold cavities. The formed products are cut free from the sheet by trim tooling. Thermoforming machines feed the sheet material into the forming station either in precut sheets, or in a continuous sheet feed off a roll, typically where thinner material is being used.

In trim-in-place roll fed machines the trimming is performed in the same station whereat the products are molded. The combined mold and trimming tools are very costly.

In post trim roll fed machines, where larger machines are the norm, standard practice has been to transfer the sheet material out of the mold station and into a separate trim press where the products are die cut from the sheet. This has the advantage of reducing the precision tooling tolerances otherwise required in the thermoforming tooling to thereby reduce the cost of the tooling.

Plug assists are used for products having deep cavities, comprising an array of plug shaped members, each mounted opposite a respective mold cavity, which are advanced into the sheet material during thermoforming, aiding in the movement of the sheet material into the mold cavities, as this prevents undue localized thinning of the material as it is stretched into conformity with the mold cavity under the influence of vacuum and/or a differential air pressure.

The forming station is located in a press having upper and lower platens, one platen carrying the mold tooling, the other carrying tooling defining sealing edges engaging the plastic sheet to create a sealed cavity around each sheet section to be formed, enabling the air pressure to stretch the material in the mold cavity and thereby form the product. Clamping of the sheet material section is also carried out as a part of the process for controlling material stretch during the thermoforming process in conjunction with the effect of the plug assists.

In post trim roll fed machines, the plug assists were in the past advanced by the press platen motion. In machines in which trimming was carried out in the forming machine, the plug assists of necessity were operated by a so-called "third platen", i.e., by a separate motion from the main platen due to the need to carry out die cutting by the main platen motion.

Recently, it has been found that to carry out plug assist motion by a third platen is advantageous, as the main platen motion can be optimized for rapid travel and powerful sheet clamping, freed from the constraints imposed by the need to carry out the plug assist motion, which is instead carried out independently by the motion of the third platen.

In the application of the third platen drive to the plug assists for roll fed machines, the spider plate has been mounted on the main platen, enclosed within a sealed box containing the spider plate and plug assists. The box must be sealed since the presence of the spider plate prevents individual sealed chambers from being provided around each plug assist.

Clamping rings are also required, capable of applying clamping pressure to sections of the sheet material around each mold cavity. In this design, the clamping rings for each cavity are attached to the top of the sealed box which is unsupported internally. The box interior is pressurized in order to pressurize the space within each clamping ring to exert air pressure on the sheet material to carry out the thermoforming process. The air pressure is exerted on the sheet material through holes in the top of box. The holes also accommodate the plug assists when these are stroked up into contact with the sheet material.

This arrangement has certain disadvantages, including the need to pressurize the entire volume of the interior of the box with each machine cycle, as the pressure is vented when the platens are retracted, and this consumption of compressed air represents a significant power usage.

Another disadvantage is that the use of the top plate of the box as a support for the clamping rings sometimes leads to cracking of the rings since the top of the box is unsupported across much of its span, and thus may not be rigid enough to avoid overstressing of the clamping rings.

Yet another substantial drawback is that the spider plate connecting all of the shafts to which the plug assists are attached and which the third platen drives, is completely enclosed within the sealed box so as to not be able to be observed. This is important since the third platen stroke must be adjusted, and a collision with the mold tooling or the base plate has in the past occurred due to overstroking of the third platen in either direction.

While other third platen arrangements have been used in trim-in-place thermoforming machines which would avoid these disadvantages, the relatively low shut heights of the prior roll fed post trim machines would preclude the other arrangement since an increased shut height is required.

It is the object of the present invention to provide an arrangement for third platen stroking of the plug assists for post trim thermoforming machines which avoids the above described disadvantages of the third platen plug assist actuation heretofore used on such machines.

SUMMARY OF THE INVENTION

The above object and others which will become apparent upon a reading of the following specification and claims are achieved by a tooling assembly having an array of cylindrical chambers, each receiving a plug assist, with an attached rod for each plug assist extending down through a clamp ring support plate assembly.

Clamping rings are defined around the top of each chamber for clamping sections of the sheet material around the mold cavity located above each chamber.

The plug assist rods extend through openings in the support plate and are sealed to the openings. The plug assist rods are connected together below the support plate by a spider plate, in turn having a series of shafts constituting a driving connection to the third platen.

The press shut height is increased to accommodate the increased overhead clearance required for this spider plate arrangement, in prior post trim machines.

A series of standoffs extend between the support plate and the main platen so as to force the clamping rings into engagement with sheet material sections by main platen stroking during each machine cycle.

Only the clearance between the plug assists and surrounding chambers is pressurized to drastically reduce the consumption of compressed air.

The standoffs provide a rigid support for the clamping plate to prevent cracking of the clamping rings. The spider plate is exposed to be viewable during adjustment of the plug assist stroking in either direction.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
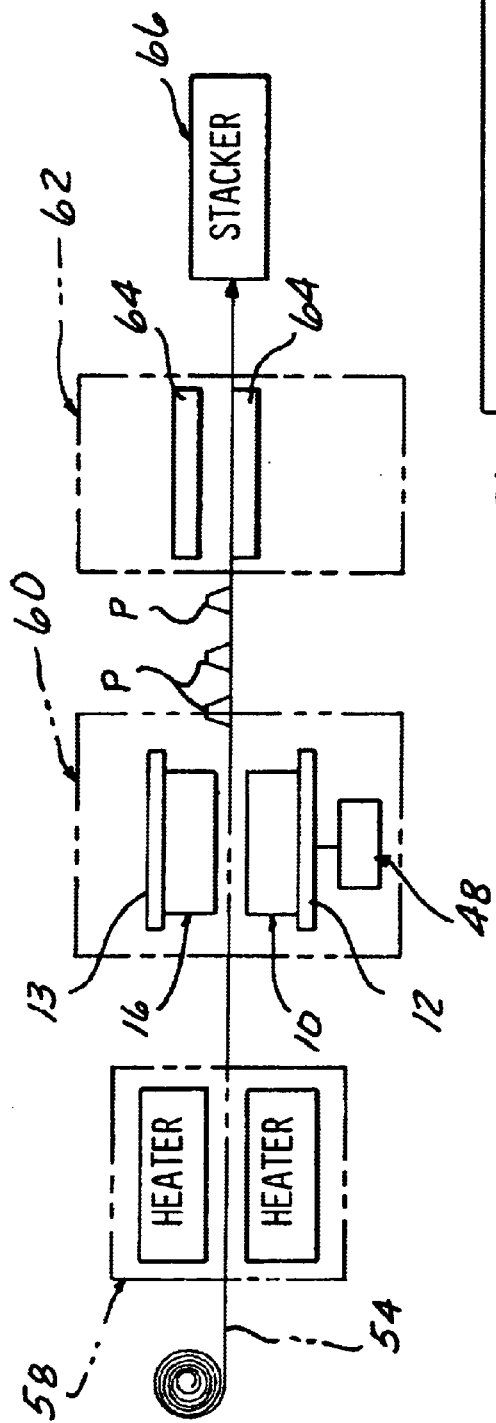
FIG. 1 is a diagrammatic representation of a thermoforming machine of the type in which the tooling assembly of the present invention is installed.

Referring to the drawings, and FIG. 1 in particular, the tooling assembly 10 according to the invention is shown mounted on the lower main platen 12 of a thermoforming press 60, operated by an actuator 14. An upper mold cavity tooling assembly 16 defining rows of mold cavities 18 is mounted on an upper main platen 13.

The sheet material 54 is fed off a roll and into preheating station 58, and then into a forming press 60 where thermoforming of products P takes place. The sheet material with the products P formed thereon is advanced into a post trim station 62 where dies 64 are operated to cut the products P free, which are then typically collected in a stacker 66 to form stacks of the products P for further handling. This and similar arrangements are well known in the art and further details will not be described herein for that reason.

Figure 4:
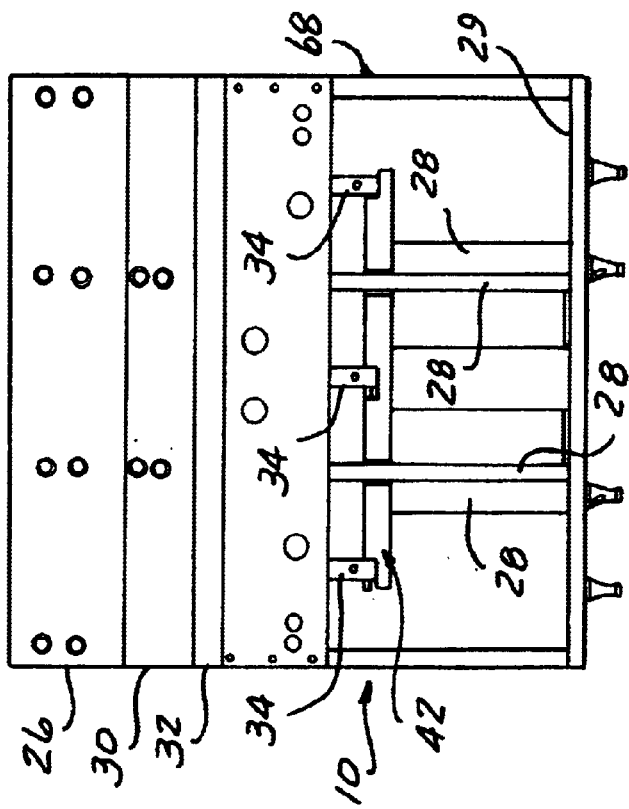
FIG. 4 is an end view of the tooling assembly according to the present invention.
Figure 2:
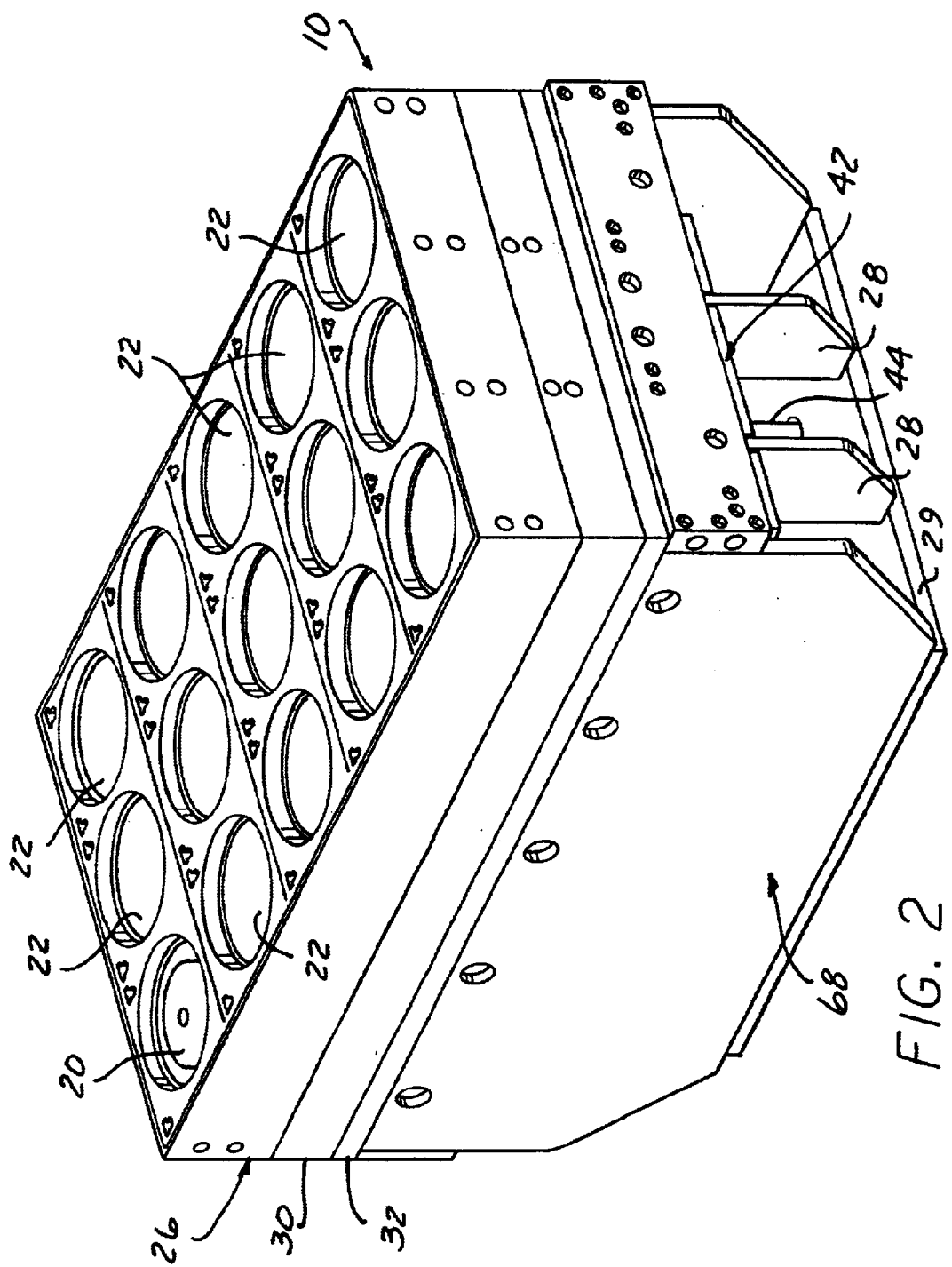
FIG. 2 is a perspective view of a thermoforming machine tooling assembly according to the present invention.
Figure 3:
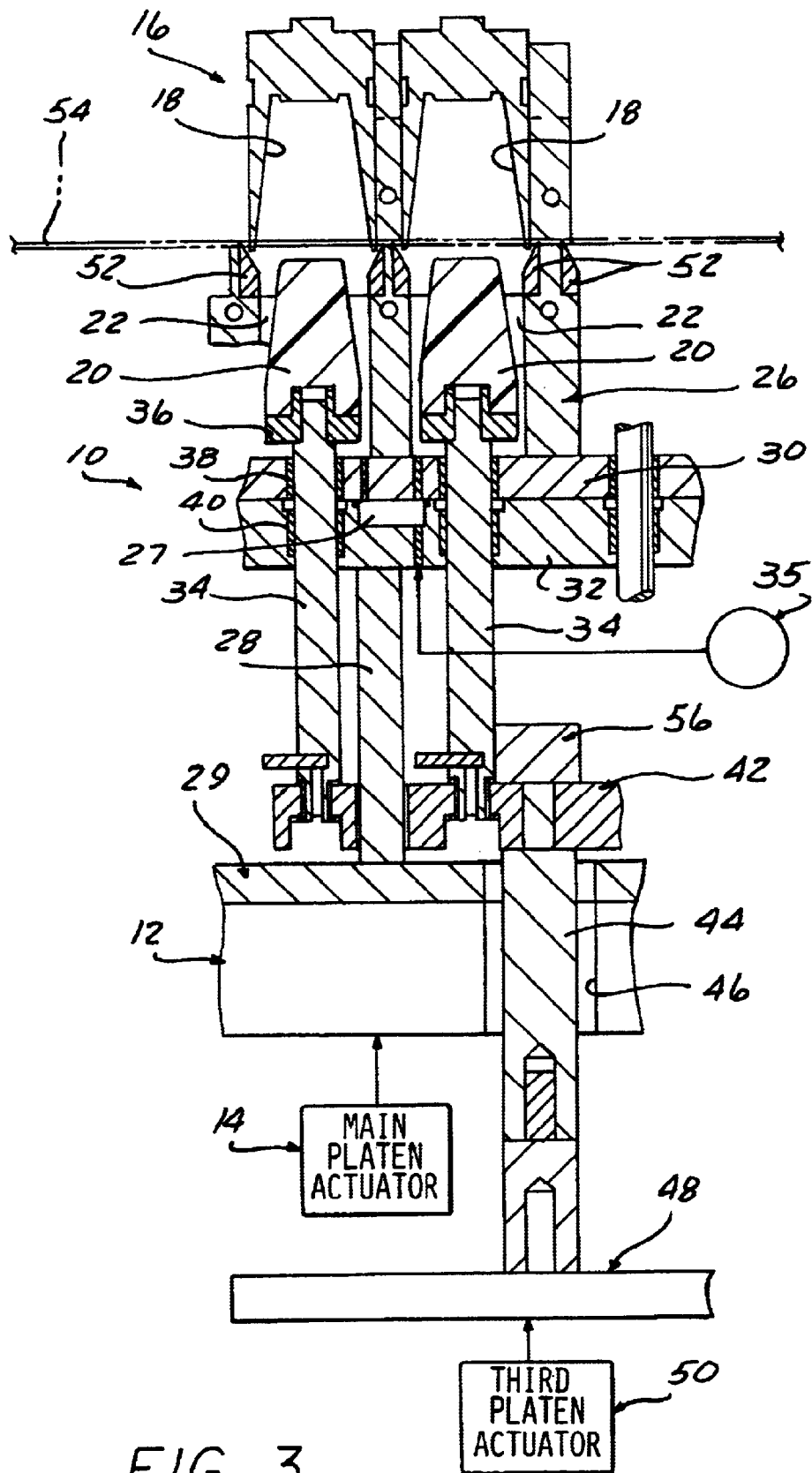
FIG. 3 is an enlarged sectional view taken through the tooling assembly shown in FIG. 1.

The tooling assembly 10 seen in further detail in FIGS. 2–4, comprises an open ended box 68 constructed of metal plate includes an array of plug assists 20 each aligned with a respective mold cavity 18. Each plug assist 20 is shown retracted in a silo comprised of a cylindrical chamber 22 defined by each one of a series of bores machined into a thick aluminum clamping plate 26.

The clamping plate 26 is supported on an assembly of one or more steel support plates 30, 32 fastened together face to face. Porting flow passages 27 machined into the abutting faces provide manifolding for communicating air pressure from a compressed air source 35 into each chamber 22 depicted diagrammatically. The support plates 30, 32 are mounted by a series of stand off plates 28 facing in different directions, and secured to a bolster plate 29 forming the bottom of the box 68 and attached to the top of the main platen 12 and the underside of the lower support plate 32.

Each plug assist 20 is secured to one end of a rod 34 received in a bottom piece 36 fixed to the lower end of each plug assist 20. The plug assists 20 are commonly constructed of syntactic foam material, such that a metal bottom piece 36 formed with a socket is required for a secure connection to the rods 34.

Each rod 34 passes through seals 38, 40 to prevent leakage of air pressure out of the chambers 22.

The lower ends of the rods 34 are connected to a common spider plate 42, located beneath the support plates 30, 32, and also the clamp plate 26, having spaces to accommodate the standoff plates 28.

The spider plate 42 is itself connected to a set of shafts 44 extending down through a bore 46 in the main platen 12, and connected to a third platen 48 lying below the main platen 12.

An actuator 50 is connected to the third platen 48 for vertically stroking the same, to cause the spider plate 42 to move the rods 34 and plug assists 20 up into the respective mold cavities 18 during a forming cycle to control the stretching of the preheated sheet material.

A series of annular clamping rings 52 are fixed surrounding the top of the chambers 22 having clamping edges which each engage a section of the sheet material 54 extending across the cavities 18 to control the stretching of the preheated sheet material during thermoforming, in the manner well known in the art.

The aggregate volume of the chambers 22 is much smaller than the sealed box formerly used in post trim machines such that compressed air usage is much reduced.

The press shut height must be increased over the formerly used arrangements, such that the press must be reconfigured to accommodate this.

The standoff plates 28 provide a rigid internal support for the support plates 30, 32, in turn providing a rigid support for the clamping plate 26 holding the clamp rings 52 so that cracking and breakage of those components is avoided.

As seen in FIG. 4, the spider plate 42 is readily visible through the open ends of the tooling box 68 to allow adjustment of the stroke of the third platen 48 without a risk of damage due to overstroking in either direction. A down stop block 56 may be provided to limit downward travel of the spider plate 42.

What is claimed is:

1. A plug assist tooling assembly in combination with a thermoforming apparatus having roll feed of sheet plastic material, a heater station for preheating said sheet material advanced from said roll feed, a press in a forming station having main platens for bringing tooling assemblies including said plug assist tooling assembly and a mold cavity tooling assembly together with a section of preheated sheet material disposed therebetween to form products in said sheet material, and a post trim apparatus separate from said press receiving said sheet material with product formed therein, and cutting said products free from said sheet material, said plug assist tooling assembly installed on one of said press platens, a third platen independently stroked from said one platen for advancing and retracting said plug assists in said plug assist tooling assembly, the improvement wherein said plug assist tooling assembly includes a plurality of plug assists each having an elongated rod attached thereto, a spider plate connecting said rods together at ends opposite said plug assists, said spider plate disposed adjacent said one platen and connected to said third platen through one or more connecting members extending through said one platen;

at least one support plate disposed between said plug assists and said spider plate, said plug assist rods sealed to openings in said support plate through which said rods pass in extending to a respective one of said plug assists;

a series of standoffs fixing said main platen relative said support plate; a clamping plate fixed relative said at least one support plate and having a series of cylindrical holes defining sealed chambers, which each receive a plug assist; and, a series of clamping rings fixed relative said clamping plate, each clamping rings encircling a hole in said clamping plate and adapted to clamp said sheet material when said main platen is stroked during a thermoforming cycle, said plug assists thereafter stroked by said third platen to engage said sheet material and air pressure is applied in said chambers to cause forming of said sheet material into cavities in said mold cavity tooling assembly.

2. The combination of claim 1 wherein said spider plate is visible from the exterior of said plug assist tooling assembly to facilitate stroke adjustment of said third platen.

3. The combination of claim 1 wherein a pair of support plates are provided fixed together in face to face relationship, with machined grooves defining sealed air passages therebetween.

4. The combination of claim 1 wherein said standoffs comprise an edge plates fixed relative to said support plate and said main platen, said spider plate having openings accommodating said standoffs.

5. The combination of claim 1 wherein said third platen is located below said main platen and one or more rods extending through openings in said main platen to said spider plate.

* * * * *